Figure 2:
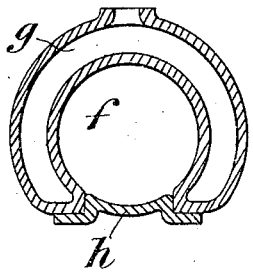

D. ROBERTS, J. W. YOUNG & C. JAMES.
INTERNAL COMBUSTION ENGINE.
APPLICATION FILED DEC. 4, 1911.
1,077,161.
Patented Oct. 28, 1913.
3 SHEETS—SHEET 1.
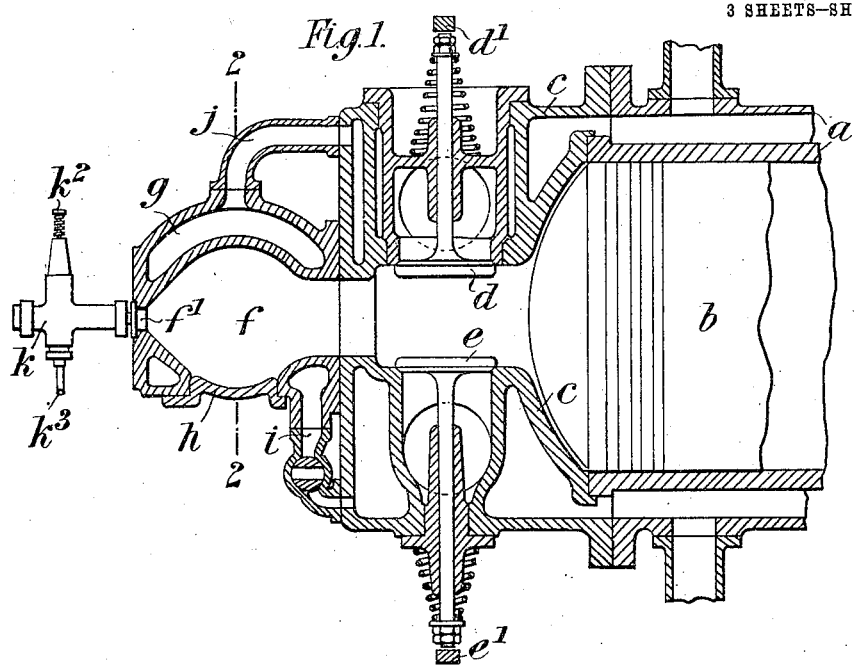
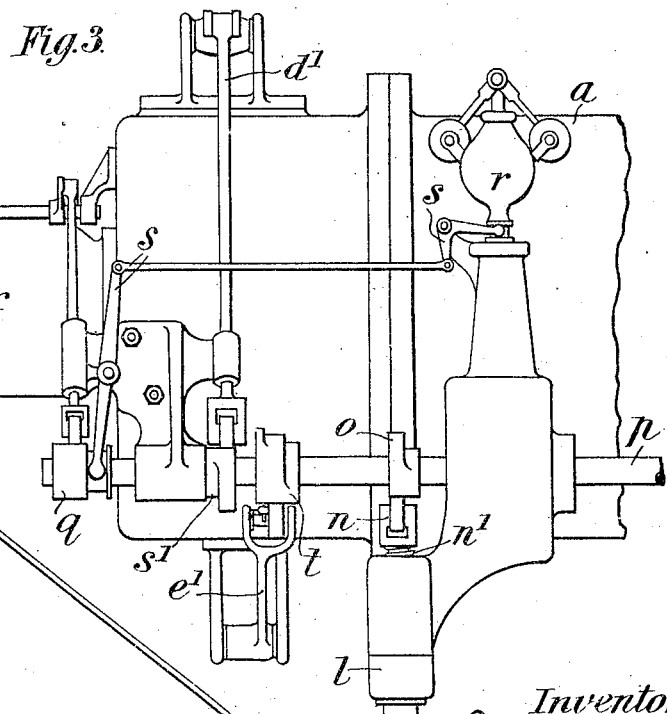
Witnesses:
J. K. Moore
Robt. E. Darry
Inventors:
David Roberts,
John W. Young,
and
Charles James
By Whitaker & Prevost
attys.

D. ROBERTS, J. W. YOUNG & C. JAMES.
INTERNAL COMBUSTION ENGINE.
APPLICATION FILED DEC. 4, 1911.

1,077,161.

Patented Oct. 28, 1913.

3 SHEETS—SHEET 2.

Witnesses:
J. K. Moore
Robt. E. Barry

Inventors:
David Roberts,
John W. Young,
Charlie James
By Whitaker & Prevost
attys.

D. ROBERTS, J. W. YOUNG & C. JAMES.
INTERNAL COMBUSTION ENGINE.
APPLICATION FILED DEC. 4, 1911.

1,077,161.

Patented Oct. 28, 1913.

3 SHEETS—SHEET 3.

Witnesses:

Inventors:
David Roberts,
John W. Young
and Charles James
By Whitaker & Prevost
attys

UNITED STATES PATENT OFFICE.

DAVID ROBERTS, JOHN WILLIAM YOUNG, AND CHARLES JAMES, OF GRANTHAM, ENGLAND.

INTERNAL-COMBUSTION ENGINE.

1,077,161.  Specification of Letters Patent.  Patented Oct. 28, 1913.

Application filed December 4, 1911. Serial No. 663,929.

*To all whom it may concern:*

Be it known that we, DAVID ROBERTS, JOHN WILLIAM YOUNG, and CHARLES JAMES, all subjects of the King of Great Britain, residing at Spittlegate Iron Works, Grantham, Lincolnshire, England, have invented new and useful Improvements in Internal-Combustion Engines, of which the following is a specification.

This invention relates to internal combustion engines of the kind wherein liquid hydrocarbon is injected at or near the end of the compression stroke into a charge of air compressed into a vaporizer connected to the cylinder of the engine by a more or less contracted neck or passage.

The object of our invention is to obtain a higher efficiency and greater power than has been possible with engines of this class as hitherto constructed, the improved engine also having the advantage that it permits of the satisfactory employment without loss of efficiency or power of a greater range in grades of liquid hydrocarbon than has been hitherto possible.

The objects above enumerated are attained according to the invention by a particular arrangement and combination of engine parts and more especially result from the shape and disposition of the vaporizer and the construction and disposition of the water jacketed and hot parts thereof, also from the position and direction in which the liquid hydrocarbon is injected into the vaporizer, and the relation of the said vaporizer to, and its manner of coöperating with, the air inlet and exhaust outlet valves taken in conjunction with the means for injecting the liquid hydrocarbon rapidly and for regulating the quantity of hydrocarbon injected in accordance with the power generated by the engine.

In carrying out our invention we construct an engine in which the cylinder is connected by a more or less narrow neck or passage with a vaporizer of spherical shape, the said spherical vaporizer being water jacketed over the whole of its surface, except a portion at the bottom or lower side, which portion forms the hot part constituting the igniter for the explosive charge. The air inlet and the exhaust outlet ports are arranged in the passage connecting the spherical vaporizer with the cylinder, the said ports being controlled by valves arranged opposite one another, and the liquid hydrocarbon is injected into the spherical vaporizer at the outer end thereof and in a direction such that it enters axially of the vaporizer and cylinder. The liquid hydrocarbon is injected into the vaporizer by means such as are described in the specification of former British Patent No. 25093 of 1906.

To enable the invention to be fully understood, we will describe it by reference to the accompanying drawings, in which—

Figure 4:
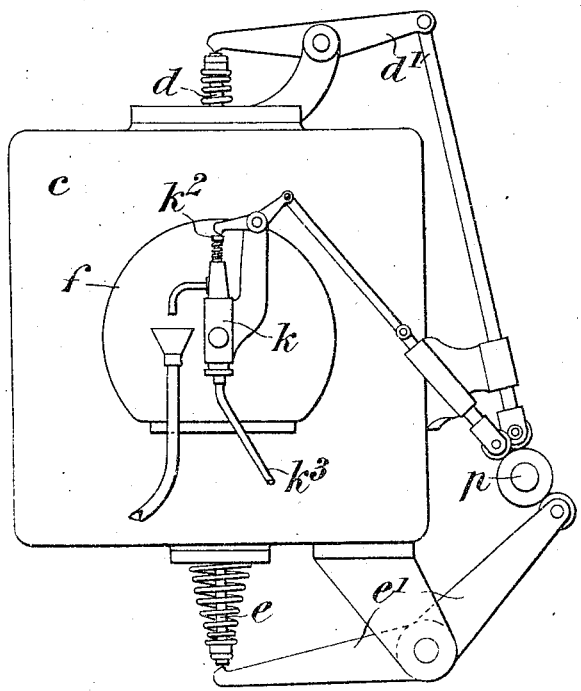
Figure 5:
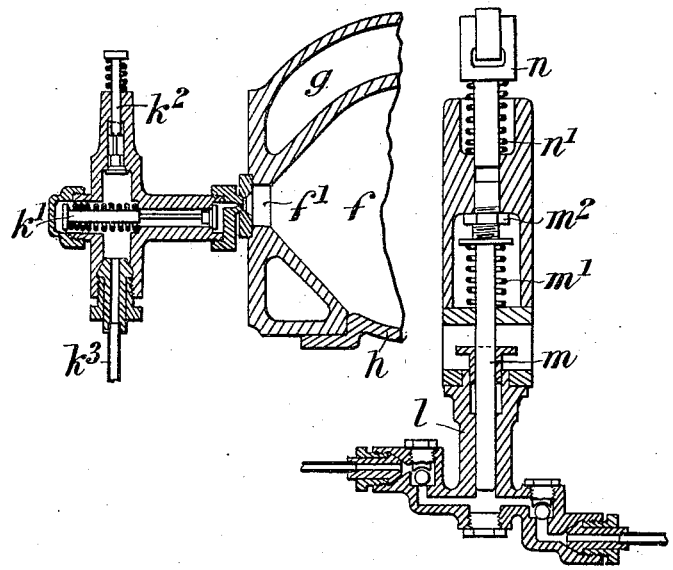
Figure 6:
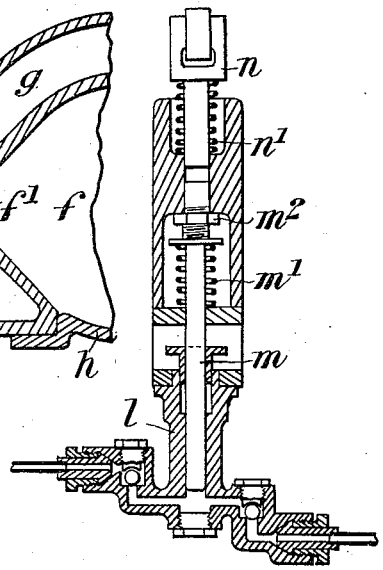
Figure 7:
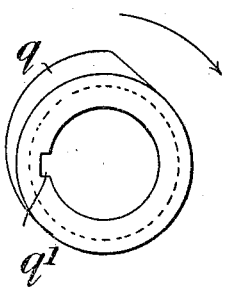
Figure 8:
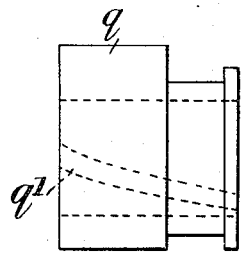
Figure 9:
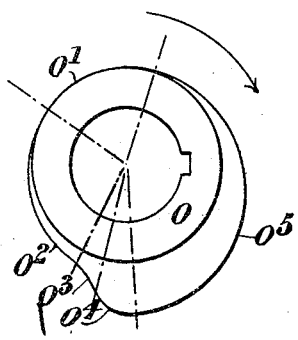
Figure 10:
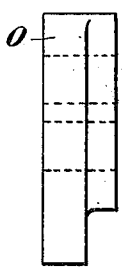

Figure 1 is a sectional elevation of a portion of a single cylinder horizontal engine constructed in accordance with our invention and adapted to operate on the four stroke cycle. Fig. 2 is a section on the line 2—2, Fig. 1. Fig. 3 is a side elevation of the engine shown in Fig. 1. Fig. 4 is an end view thereof. Fig. 5 is a vertical section through the vaporizer valve box. Fig. 6 is a similar section of the fuel oil pump, and Figs. 7 and 8 are side and end elevations respectively of the governor cam, and Figs. 9 and 10 are similar views of the fuel pump operating cam.

$a$ is the cylinder, which is water-cooled in the usual manner, $b$ is the piston and $c$ is the end or cover of the cylinder which contains the air inlet valve $d$ and the exhaust outlet valve $e$, the axes of these two valves being disposed at right angles to the longitudinal axis of the engine and being located in a vertical plane.

$f$ is the vaporizer, which is of spherical shape as above stated and is provided over the major portion with the water jacket $g$, the unjacketed portion $h$ being at the lower part of the vaporizer and constituting the igniter. This igniter is heated up by an external lamp when the engine is first started, the lamp being extinguished when the engine is running. Also it will be understood that it may be made plain as shown in the drawing, or it may be formed with a ribbed or corrugated face to increase the heating surface.

$i$ is the pipe through which the water enters the jacket $g$ and $j$ is the outlet pipe conveying the water from the jacket.

At its outer end the spherical vaporizer $f$ is formed with a neck $f^1$ the axis of which coincides with the longitudinal center line of the engine and vaporizer, and which has fitted to it the valve-box $k$ fitted with the horizontal check-valve $k^1$ and the vertical relief-valve $k^2$, the fuel being supplied to the said valve-box through the pipe $k^3$ which extends from the pump $l$. The said pump and its operating gear is of the construction described in the specification of the aforesaid prior British Patent No. 25093 of 1906, that is to say it comprises the cylinder in which there reciprocates a plunger $m$ caused to move on its up or suction stroke by a spring $m^1$, the said upward stroke being limited by the stop $m^2$. The plunger is depressed by means of the striker $n$ which is held by the spring $n^1$ against the face of the operating cam $o$ mounted upon the cam shaft $p$. This cam $o$ is shown in Figs. 9 and 10 and is formed with five faces, namely, the faces $o^1$, $o^2$, $o^3$, $o^4$ and $o^5$. The face $o^1$ is concentric with the axis of the cam shaft $p$ and is designed to provide an idle period for the pump plunger, in order to give the valve time to seat itself at the end of the suction stroke; the second face $o^2$ is snail-shaped and is designed to bring the striker $n$ gently into contact with the pump plunger $m$. The third face $o^3$ is the actual delivery face and effects the forcing stroke of the pump plunger $m$. $o^4$ is an extension of the face $o^3$ which merges into the fifth face $o^5$ which is again of a snail-shape and permits the gradual or slow return or suction stroke of the plunger. Upon the cam shaft $p$ there is also mounted the cam $q$ shown detached in Figs. 7 and 8, this cam serving to actuate the vertical valve $k^2$ in the vaporizer valve-box $k$. The said cam is mounted upon the shaft $p$ by means of a key upon the latter which engages in the spiral keyway $q^1$ in the cam designed to be moved axially along the shaft $p$ by means of the governor $r$ which controls the said cam by means of the link and lever mechanism $s$. The axial movement of the cam causes the same to rotate relatively to the shaft so that its position is varied as the speed of the engine fluctuates, thus controlling the operation of the relief-valve in accordance with the fluctuating speed. The cam shaft $p$ also has mounted upon it the cam $s^1$ and $t$ which respectively control the air inlet valve $d$ and exhaust outlet valve $e$ through the medium of the mechanisms $d^1$ and $e^1$.

In operation, assuming that the engine has been started by the preliminary heating of the hot part $h$ of the vaporizer $f$, the fuel is supplied by means of the pump $l$ to the vaporizer valve-box $k$ and is injected therefrom through the neck $f^1$ axially into the spherical vaporizer whereby it is projected into the charge of air which has been compressed into the said vaporizer by the compression stroke of the piston. The explosive charge thus produced is ignited by the hot part of the vaporizer and the working stroke of the piston takes place and is succeeded by the exhaust stroke in the ordinary manner.

The particular shape, construction and disposition of the various parts forming the complete engine, we have found in practice to give rise to a higher efficiency than it has been hitherto possible to attain with engines of this type and in addition to the higher efficiency, our engine possesses sundry advantages chief among which may be mentioned the fact that a larger range of different grades of liquid fuel can be employed without the efficiency of the engine being thereby sensibly affected.

Our invention has been above particularly described as applied to a single cylinder horizontal engine, but it will be obvious that it is equally applicable to multi-cylinder engines and also to engines of the vertical and inclined types.

Having now fully described and ascertained our said invention and the manner in which it is to be performed we declare that what we claim is:—

In an internal combustion engine, the combination with a cylinder, a spherical vaporizer water jacketed throughout its extent except at the bottom thereof where it is provided with a hot ignition plate, a narrow neck connecting the vaporizer and the cylinder, a liquid hydrocarbon injection device connected at the outer end of the vaporizer and having its discharge aperture disposed axially of the vaporizer, the said neck and the cylinder, said neck being provided with an air inlet aperture and an exhaust aperture arranged opposite to each other, and controlling valves for said air inlet and exhaust apertures.

DAVID ROBERTS.
JOHN WILLIAM YOUNG.
CHARLES JAMES.

Witnesses:
WALTER HAYNES,
SAMUEL WILLIAM PAYNE.